United States Patent
Tsukui et al.

(10) Patent No.: US 7,089,906 B2
(45) Date of Patent: Aug. 15, 2006

(54) MULTI-CYLINDER ENGINE

(75) Inventors: Takaaki Tsukui, Wako (JP); Toshiyuki Sato, Wako (JP); Satoru Nojima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 10/804,809

(22) Filed: Mar. 19, 2004

(65) Prior Publication Data
US 2004/0200445 A1 Oct. 14, 2004

(30) Foreign Application Priority Data
Mar. 26, 2003 (JP) ............................. 2003-085245

(51) Int. Cl.
F02B 75/20 (2006.01)
F02D 17/02 (2006.01)

(52) U.S. Cl. .................................. 123/198 F; 123/58.1

(58) Field of Classification Search ............ 123/198 F, 123/481, 90.15, 90.16, 90.17
See application file for complete search history.

(56) References Cited

U.S. PATENT DOCUMENTS 4,556,025 A * 12/1985 Morita .................... 123/198 F
4,848,284 A * 7/1989 Konno ..................... 123/90.16
5,361,734 A 11/1994 Shirai
5,425,335 A * 6/1995 Miyamoto et al. ........ 123/198 F
5,490,486 A 2/1996 Diggs
5,490,758 A 2/1996 Stone
5,636,609 A * 6/1997 Fujiyoshi ................ 123/198 F
5,758,612 A 6/1998 Tsuzuku et al.
6,318,316 B1 * 11/2001 Tsukui et al. ............ 123/90.16

FOREIGN PATENT DOCUMENTS

| EP | 0 703 357 | 3/1996 |
| JP | 7-150982 | 6/1995 |
| JP | 2000-205038 | 7/2000 |

* cited by examiner

Primary Examiner—Henry C. Yuen
Assistant Examiner—Hyder Ali
(74) Attorney, Agent, or Firm—Hamre, Schumann, Mueller & Larson PC

(57) ABSTRACT

The invention provides a multi-cylinder engine wherein, even where it is structured such that a cam chain case is provided on a side portion of the engine, a working fluid supply path can be simplified and the weight and size of a cylinder head reduced. According to the invention, a multi-cylinder engine is provided wherein at least one of a plurality of engine valves of a cylinder head can be cut off from its corresponding combustion chambers such that a first intake valve, a second intake valve, a first exhaust valve, and a second exhaust valve are positioned on the opposite side to a cam chain case.

10 Claims, 8 Drawing Sheets

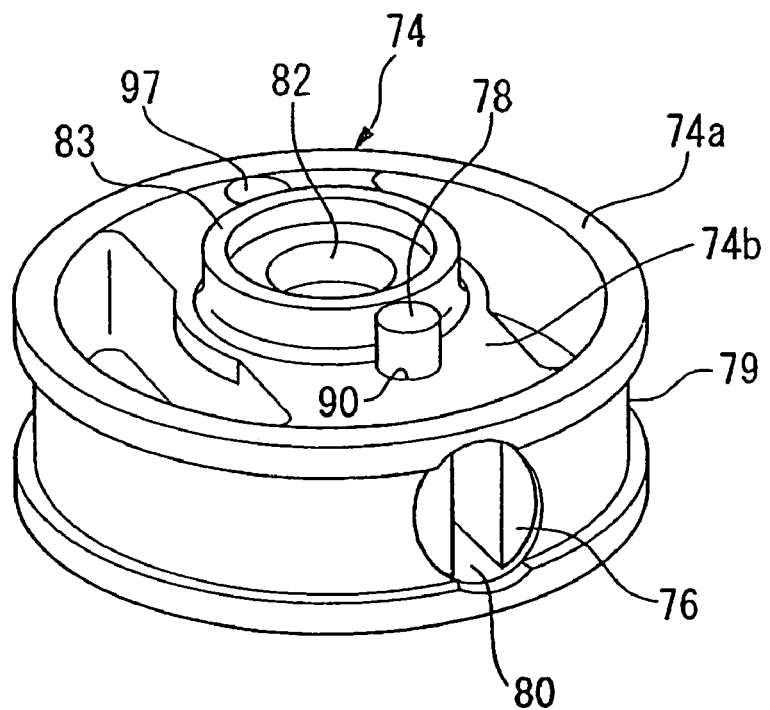

MULTI-CYLINDER ENGINE

CROSS REFERENCE TO RELATED APPLICATIONS

This application claims priority to JP 2003-085245.

FIELD OF THE INVENTION

This invention relates to a multi-cylinder engine which includes cylinders that can be cut off.

BACKGROUND OF THE INVENTION

A multi-cylinder engine is available wherein a plurality of cylinders are divided into at least two groups and are each formed from cylinders each of which can be cut off (i.e., turned off) by placing a throttle valve thereof into a closed state using a link or a rod such that the number of operating cylinders can be adjusted in response to the engine load. For an example refer to JP 07-150982.

Also another multi-cylinder engine is available wherein a cylinder cut-off mechanism provided for an engine valve is operated hydraulically without a link or a rod to place the engine valve into a closed state. For an example refer to JP 2000-205038 (U.S. Pat. No. 6,318,316).

In the former multi-cylinder engine, the link or rod restricts the degree of freedom of the arrangement of auxiliary apparatuses located around the engine. Similarly, in the latter multi-cylinder engine the port that supplies pressure oil therethrough in a side wall of the engine may restrict the degree of freedom of the auxiliary apparatuses located around the engine.

Moreover, where the latter cylinder cut-off mechanism is applied to a multi-cylinder engine structured such that a cam chain case is disposed transversely across the engine in order to facilitate maintenance and reduce the weight and size of the engine, a working fluid supply port cannot be provided in a side of the engine on which the cam chain case is disposed. Therefore, resulting working fluid supply path is complicated and the cylinder head is obliged to have an increased size and weight.

SUMMARY OF THE INVENTION

The present invention provides a multi-cylinder engine wherein, even where it is structured such that a cam chain case is provided on a side portion of the engine, a working fluid supply path can be simplified thereby reducing the size and the weight of a cylinder head.

According to a first embodiment, a multi-cylinder engine wherein at least one of a plurality of engine valves is provided on a cylinder head is formed as part of a cylinder which can be cut off from a combustion chamber. Wherein the valves corresponding to the combustion chamber are positioned on the opposite side to a cam chain case.

Where the multi-cylinder engine is configured in this manner, it is possible to locate ports for many working fluid supply paths on a side wall of the cylinder head on the opposite side to the cam chain case in which the working fluid supply paths are formed in order to cut off all of the engine valves.

According to the invention, the multi-cylinder engine can be an in-line four cylinder engine. Where the multi-cylinder engine is an in-line four cylinder engine, the length of the engine can be minimized in accordance with the above arrangement. In addition, the cylinders on one end side of the in-line arrangement of the cylinders can be formed as normally operative cylinders while the cylinders on the other end side can be formed as cylinders which can be cut off.

Where the multi-cylinder engine is configured according to the invention, it is possible to set ports for working fluid supply paths to a side wall of the cylinder head of the cylinders which can be cut off.

BRIEF DESCRIPTION OF THE DRAWINGS

FIG. 6 is a perspective view of a pin holder in the embodiment as viewed from above.

FIG. 7 is a perspective view of the pin holder in the embodiment as viewed from below.

DETAILED DESCRIPTION OF THE INVENTION

Figure 1:
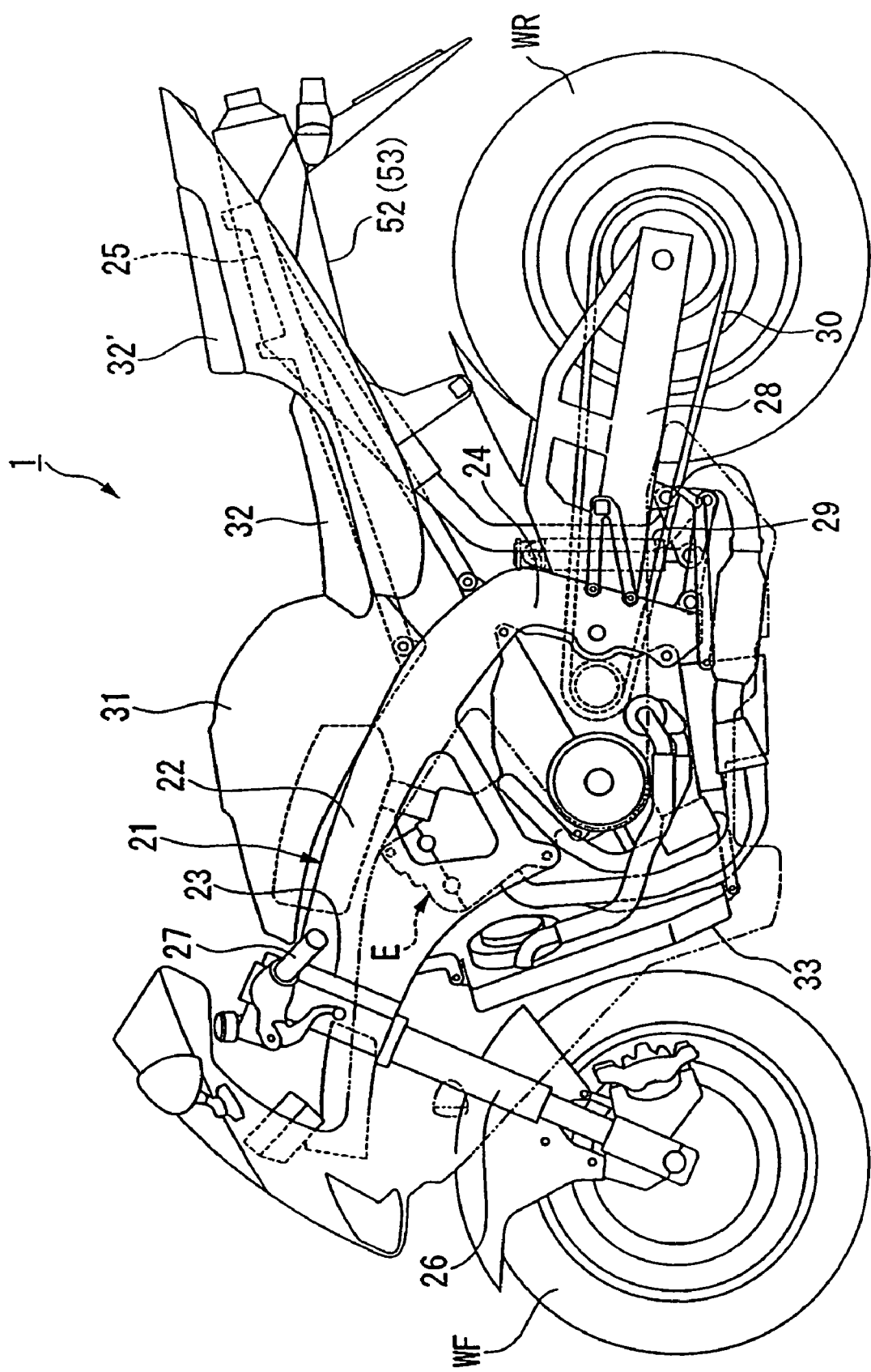
FIG. 1 is a side elevational view of a motorcycle of an embodiment of the present invention.

The present invention is described with reference to the drawings. FIG. 1 is a side elevational view of a motorcycle 1. A vehicle body frame 21 of the motorcycle 1 includes a head pipe 23, main frames 22 extending obliquely rearward from the head pipe 23, a center frame 24 extending downward from rear ends of the main frames 22, and a seat stay 25 extending rearward from the main frames 22.

A front fork 26 on which a front wheel $W_F$ is supported is supported for steering operation by the head pipe 23, and a steering handle bar 27 is connected to the front fork 26. Meanwhile, a rear fork 28 on which a rear wheel $W_R$ is supported is supported for upward and downward rocking motion at a rear portion of one of the main frames 22, and a cushion unit 29 is provided between the center frame 24 and the rear fork 28 through a linkage.

An engine E is supported on the main frames 22 and the center frame 24, and power of the engine E is transmitted to the rear wheel $W_R$ through a speed change gear incorporated in the engine E and a chain power transmission system 30. A fuel tank 31 is carried on the left and right main frames 22 and the center frame 24 such that it is positioned above the engine E, and seats 32 and 32' for a driver and a passenger are attached to the seat stay 25. A radiator 33 is disposed forward of the engine E.

Figure 2:
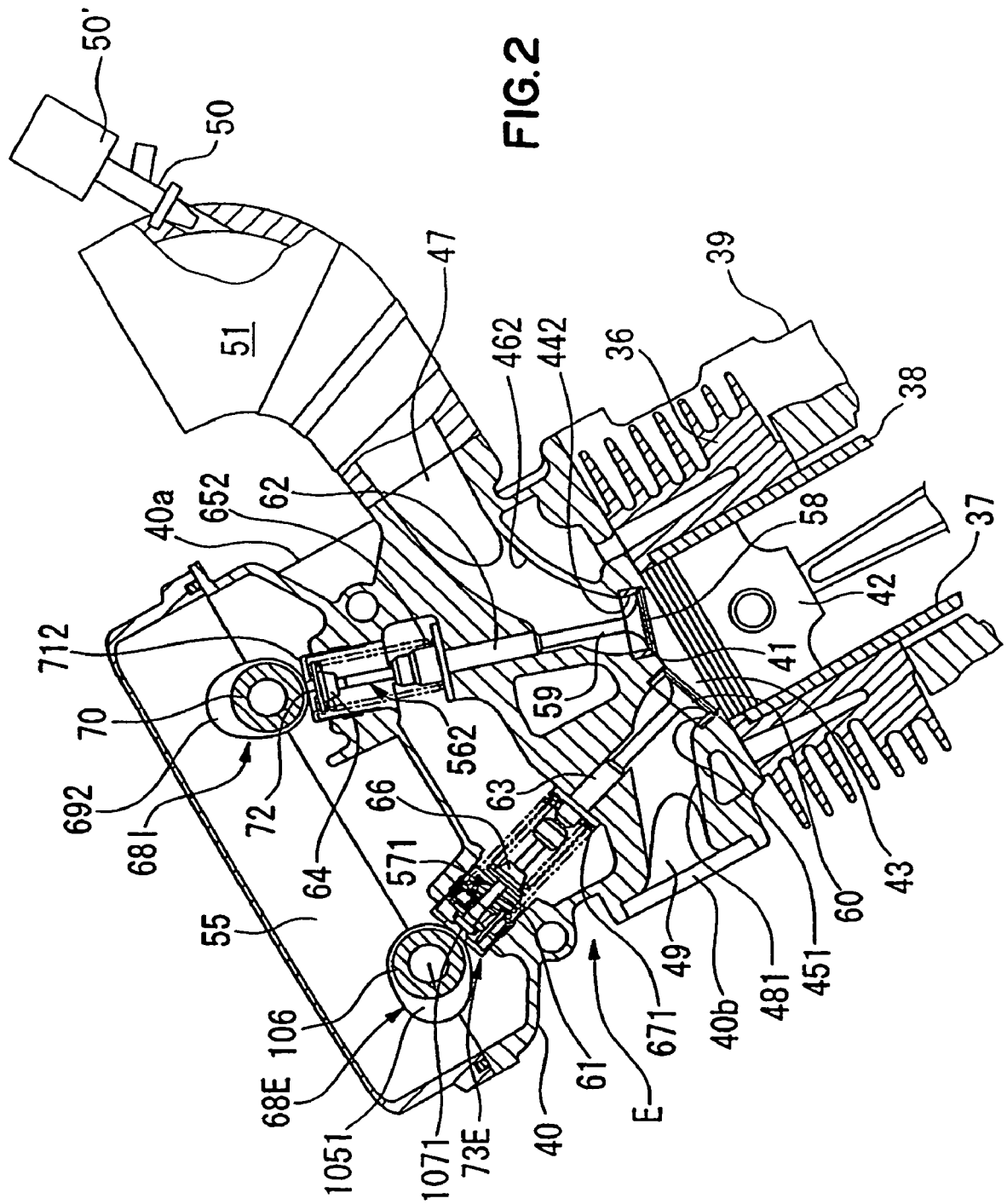
FIG. 2 is a sectional view taken along line 2—2 of FIG. 4.
Figure 3:
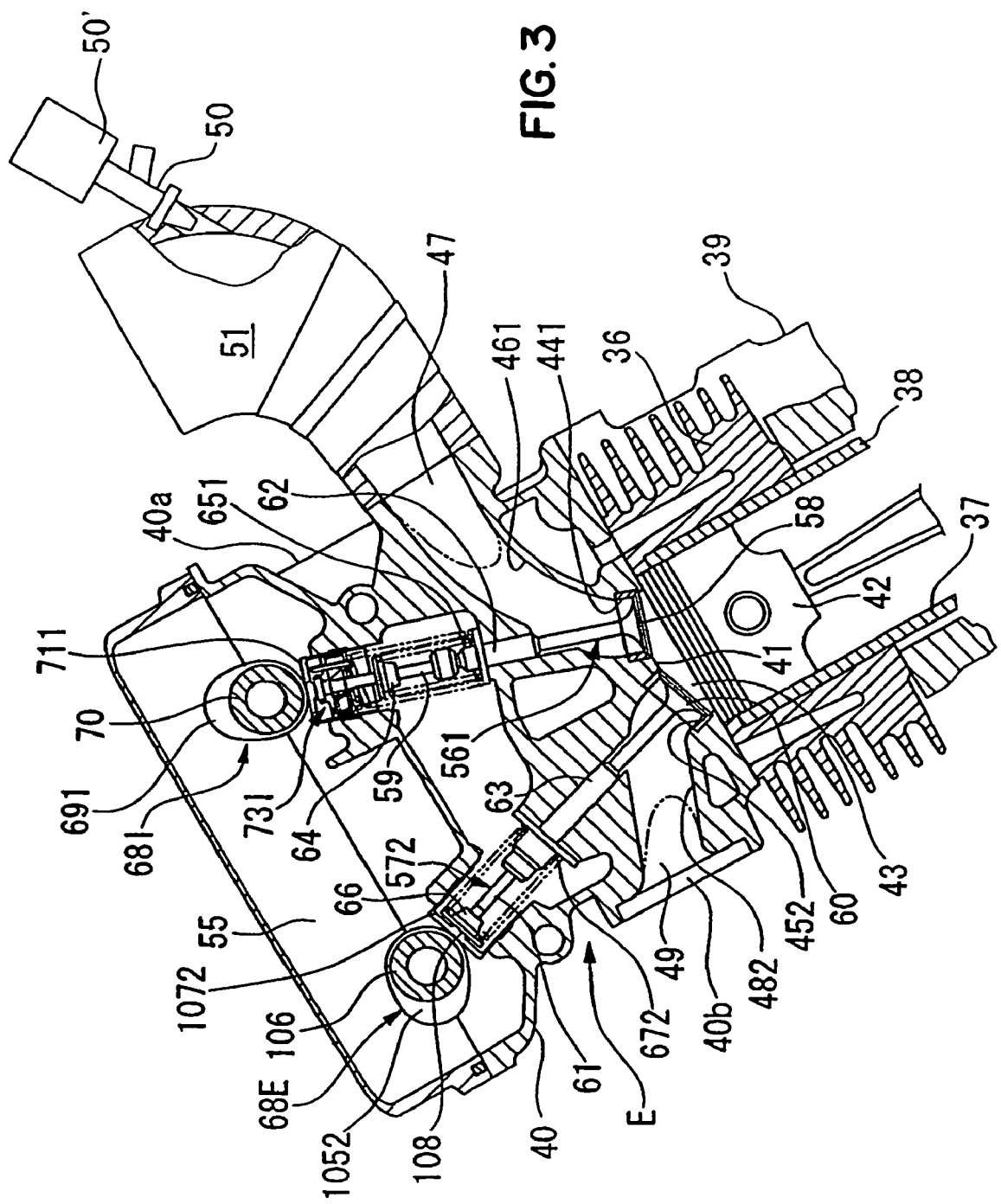
FIG. 3 is a sectional view taken along line 3—3 of FIG. 4.
Figure 4:
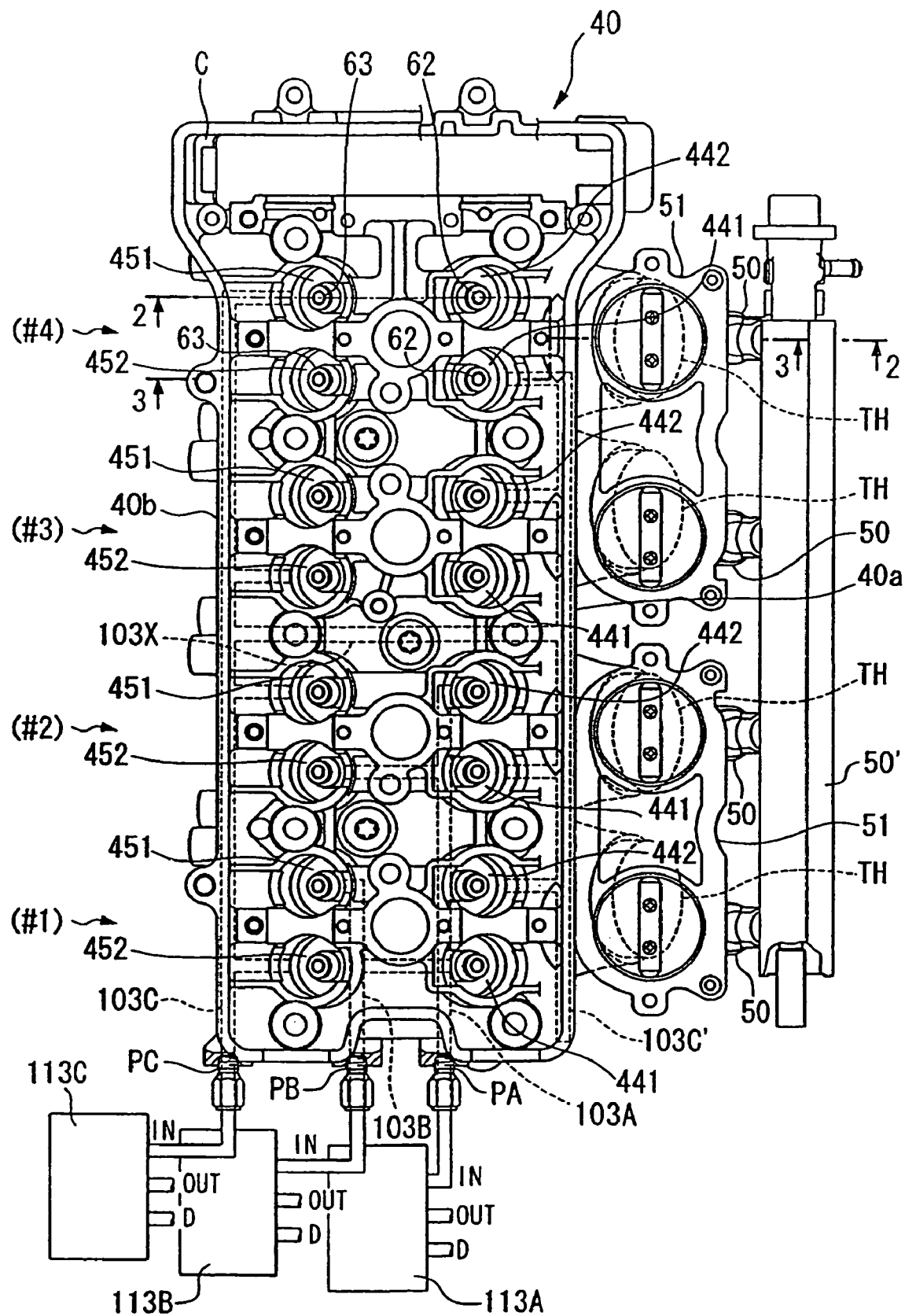
FIG. 4 is a plan view of a cylinder head of the embodiment.

As shown in FIGS. 2 to 4, the engine E is a multi-cylinder engine. For example, the engine can be an in-line four-cylinder 4-cycle DOHC engine wherein at least one intake valve or exhaust valve from among a plurality of intake valves and exhaust valves provided on a cylinder head 40 is formed as a cylinder which can be cut off using hydraulic pressure for each of combustion chambers 43 corresponding to cylinder bores 37 as hereinafter described.

In the following description, the cylinders are individually represented as #1 cylinder, #2 cylinder, #3 cylinder, and #4 cylinder in order from a side opposite a cam chain case C. For convenience, the following description is given principally with reference to a sectional view of the #4 cylinder. It is to be noted that FIGS. 2 and 3 are sectional views of the #4 cylinder and, particularly, FIG. 2 is a sectional view taken along line 2—2 of FIG. 4 and FIG. 3 is a sectional view taken along line 3—3 of FIG. 4. Further, in FIG. 4, the reference numerals of the corresponding cylinders are denoted in parentheses.

Four cylinder bores 37 are formed in a cylinder block 36 of the engine E such that they are arranged in the widthwise direction of the vehicle body frames 21. In particular, cylindrical cylinder liners 38, which form the cylinder bores 37, are securely mounted at positions on the cylinder block 36 spaced from each other along the widthwise direction of the vehicle body frame 21. The cylinder liners 38 partially project into an upper crankcase 39 coupled to a lower portion of the cylinder block 36.

The cylinder head 40 is coupled to an upper portion of the cylinder block 36. Protrusions 41 are provided on the coupling face of the cylinder head 40 to the cylinder block 36 in an individually corresponding relationship to the cylinder bores 37. Pistons 42 and combustion chambers 43 including the protrusions 41 are formed between the tops of the pistons 42 and the cylinder head 40.

A plurality of, for example, a pair of, first and second intake valve ports 441 and 442 and a plurality of, for example, a pair of, first and second exhaust valve ports 451 and 452 are provided for each of the cylinders in the cylinder head 40. The first and second intake valve ports 441 and 442 are open to the combustion chamber 43, and also the first and second exhaust valve ports 451 and 452 are open to the combustion chamber 43. The first intake valve port 441 and the first exhaust valve port 451 are disposed at substantially symmetrical positions to each other with respect to the center of the combustion chamber 43. Also the second intake valve port 442 and the second exhaust valve port 452 are disposed at substantially symmetrical positions to each other with respect to the center of the combustion chamber 43.

A first intake path 461 connecting to the first intake valve port 441, a second intake path 462 connecting to the second intake valve port 442 and an intake port 47 are provided in the cylinder head 40. The intake port 47 connects commonly to the first and second intake paths 461 and 462 and is open to a first side face 40a of the cylinder head 40. The first side face 40a of the cylinder head 40 to which the intake ports 47 are open are disposed so as to face the rear side along the running direction of the motorcycle.

A first exhaust path 481 connecting to the first exhaust valve port 451, a second exhaust path 482 connecting to the second exhaust valve port 452 and an exhaust port 49 are provided for each of the combustion chambers 43 in the cylinder head 40. The exhaust port 49 connects commonly to the first and second exhaust paths 481 and 482 and is open to the other or second side face 40b of the cylinder head 40. The second side face 40b of the cylinder head 40 to which the exhaust ports 49 are open is disposed so as to face the front side along the running direction of the motorcycle.

An intake apparatus 51 is connected to each of the intake ports 47. The intake apparatus 51 includes a fuel inject valve 50 for supplying fuel to each of the intake ports 47. It is to be noted that reference character 50' denotes a fuel line, and TH a throttle valve. Further, an exhaust apparatus 53 is connected to each of the exhaust ports 49. The exhaust apparatus 53 includes an exhaust muffler 52 disposed on the right side of the rear wheel $W_R$ in a state wherein it is directed forward in the running direction of the motorcycle.

Connection/disconnection between the first intake valve port 441 and the first intake path 461 and connection/disconnection between the second intake valve port 442 and the second intake path 462 are changed over by the first and second intake valves 561 and 562 as engine valves. Meanwhile, connection/disconnection between the first exhaust valve port 451 and the first exhaust path 481 and connection/disconnection between the second exhaust valve port 452 and the second exhaust path 482 are changed over by the first and second exhaust valves 571 and 572 as engine valves.

Each of the first and second intake valves 561 and 562 includes a valve stem 59 connected integrally at a base end thereof to a valve body portion 58 which can close up a corresponding one of the first and second intake valve ports 441 and 442. Meanwhile, each of the first and second exhaust valves 571 and 572 includes a valve stem 61 connected integrally at a base end thereof to a valve body portion 60 which can close up a corresponding one of the first and second exhaust valve ports 451 and 452.

The valve stems 59 of the first and second intake valves 561 and 562 are fitted for sliding movement in guide tubes 62 provided in the cylinder head 40. Meanwhile, the valve stems 61 of the first and second exhaust valves 571 and 572 are fitted for sliding movement in guide tubes 63 provided in the cylinder head 40.

A retainer 64 is secured to a portion of the valve stem 59 of the first intake valve 561 which projects upward from the guide tube 62. The first intake valve 561 is biased in a direction in which it closes up the first intake valve port 441 by a valve spring 651 in the form of a coil spring provided between the retainer 64 and the cylinder head 40. Another retainer 64 is secured to a portion of the valve stem 59 of the second intake valve 562 which projects upward from the guide tube 62. The second intake valve 562 is biased in a direction in which it closes up the second intake valve port 442 by a valve spring 652 in the form of a coil spring provided between the retainer 64 and the cylinder head 40.

Similarly, the first exhaust valve 571 is biased in a direction in which it closes up the first exhaust valve port 451 by a valve spring 671 in the form of a coil spring provided between the cylinder head 40 and a retainer 66 secured to the valve stem 61 of the first exhaust valve 571. Meanwhile, the second exhaust valve 572 is biased in a direction in which it closes up the second exhaust valve port 452 by a valve spring 672 in the form of a coil spring provided between the cylinder head 40 and another retainer 66 secured to the valve stem 61 of the second exhaust valve 572.

The first and second intake valves 561 and 562 of the combustion chambers 43 are driven by an intake side valve system 68I. The intake side valve system 68I includes a camshaft 70, valve lifters 711, 712 of a bottomed cylindrical shape. The camshaft 70 has provided thereon first intake side valve cams 691 which individually correspond to the first intake valves 561, and second intake side valve cams 692 which individually correspond to the second intake valves 562. The valve lifters 711 are supported on the cylinder head 40 such that they slidably move following the first intake side valve cams 691. The valve lifters 712 are supported on the cylinder head 40 such that they slidably move following the second intake side valve cams 692.

The camshaft 70 has an axial line which intersects perpendicularly with extension lines of axial lines of the valve stems 59 of the first and second intake valves 561 and 562 and is supported for rotation between the cylinder head 40 and a holder 55 coupled to the cylinder head 40. The valve lifters 711 are fitted for sliding movement in the cylinder head 40 in same coaxial directions as the axial lines of the valve stems 59 of the first intake valves 56I. The outer faces of the closed ends of the valve lifters 71I are held in sliding contact with the first intake side valve cams 69I. Further, the valve lifters 71₂ are fitted for sliding movement in the cylinder head 40 in same coaxial directions as the axial lines of the valve stems 59 of the second intake valves 56₂. The outer faces of the closed ends of the valve lifters 71₂ are held in sliding contact with the second intake side valve cams 69₂.

The tip ends of the valve stems 59 of the second intake valves 56₂ contact with the inner faces of the closed ends of the valve lifters 71₂ through shims 72 such that, during operation of the engine E, the valve stems 59 are normally operated to open and close the second intake valves 56₂ by the second intake side valve cams 69₂.

Meanwhile, a valve cut-off mechanism 73I is provided between each of the valve stems 59 of the first intake valves 56I and the corresponding valve lifter 71I. The valve cut-off mechanism 73I can change over between an active state and an inactive state in the valve opening direction from the valve lifter 71I to the first intake valve 56I. Thus, when the engine E is in a particular operation region, for example, when the engine E is in a low load region such as a low speed operation region, the valve cut-off mechanism 73I places the first intake valve 56I into a cut-off state irrespective of a sliding movement of the valve lifter 71I.

Figure 5:
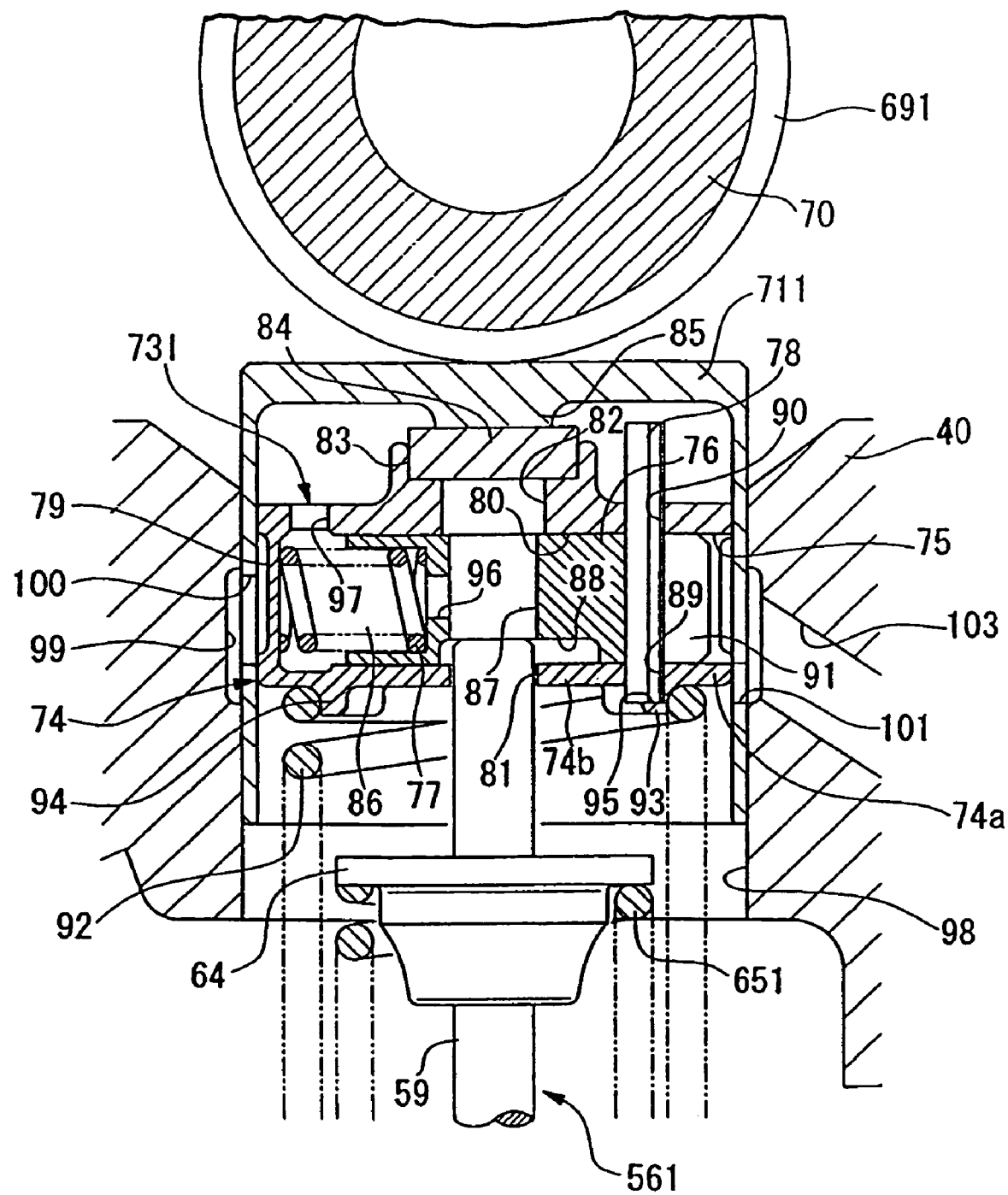
FIG. 5 is a partial enlarged sectional view of FIG. 3.

As shown in FIG. 5 which shows part of FIG. 3 in an enlarged scale, the valve cut-off mechanism 73I includes a pin holder 74, a slide pin 76, a return spring 77 and a stopper pin 78. The pin holder 74 is fitted for sliding movement in the valve lifter 71I. The slide pin 76 is fitted for sliding movement in the pin holder 74 and cooperates with the inner face of the valve lifter 71I to form a hydraulic pressure chamber 75. The return spring 77 is interposed between the slide pin 76 and the pin holder 74 and exerts spring force for biasing the slide pin 76 in a direction in which the volume of the hydraulic pressure chamber 75 decreases. The stopper pin 78 is provided between the pin holder 74 and the slide pin 76 and blocks rotation of the slide pin 76 around its axial line.

As shown in FIGS. 6 and 7, the pin holder 74 has integrally provided thereon a ring portion 74a which is fitted for sliding movement in the valve lifter 71I and a bridging portion 74b which bridges the inner periphery of the ring portion 74a along a diametrical line of the ring portion 74a. The inner periphery of the ring portion 74a and the opposite side faces of the bridging portion 74b are recessed by removing material in order to reduce the weight of the pin holder 74. The pin holder 74 having such a configuration as just described is formed by lost wax casting or forging of iron or aluminum alloy or otherwise from a synthetic resin material. The outer peripheral face of the pin holder 74 made of metal, that is, the outer peripheral face of the ring portion 74a, and the inner peripheral face of the valve lifter 71I are formed by a cementation process.

An annular groove 79 is provided on the outer periphery of the ring portion 74a, and a bottomed sliding hole 80 is provided in the bridging portion 74b of the pin holder 74. The sliding hole 80 has an axial line along a diametrical line of the ring portion 74a, that is, an axial line perpendicular to the axial line of the valve lifter 71I, and is open at an end thereof to the annular groove 79 but is closed up at the other end thereof. An insertion hole 81 is provided at a lower portion of a central portion of the bridging portion 74b and is open at an inner end thereof to the sliding hole 80. An end portion of the valve stem 59 of the first intake valve 56I is inserted in the insertion hole 81. An extension hole 82 is provided coaxially with the insertion hole 81 at an upper portion of a central portion of the bridging portion 74b such that it can receive an end portion of the valve stem 59 of the first intake valve 56I. The extension hole 82 cooperates with the insertion hole 81 to sandwich the sliding hole 80.

A cylindrical accommodating tubular portion 83 coaxial with the axial line of the extension hole 82 is provided integrally with the bridging portion 74b of the pin holder 74 at a location at which it is opposed to the closed end of the valve lifter 71I. A disk-shaped shim 84 is partly fitted in the accommodating tubular portion 83 and closes up an end portion of the extension hole 82 on the closed end side of the valve lifter 71I. In addition, a projection 85 is provided integrally with a central portion of the inner face of the closed end of the valve lifter 71I and contacts with the shim 84. The slide pin 76 is fitted for sliding movement in the sliding hole 80 of the pin holder 74. It is to be noted that, where the pin holder 74 is made of a synthetic resin material, only the slidably contacting portion thereof with the slide pin 76 may be made of a metal material.

The hydraulic pressure chamber 75 is formed between one end of the slide pin 76 and the inner face of the valve lifter 71I in a communicating relationship with the annular groove 79. A spring chamber 86 is formed between the other end of the slide pin 76 and the closed end of the sliding hole 80, and a return spring 77 is accommodated in the spring chamber 86.

Figure 8:
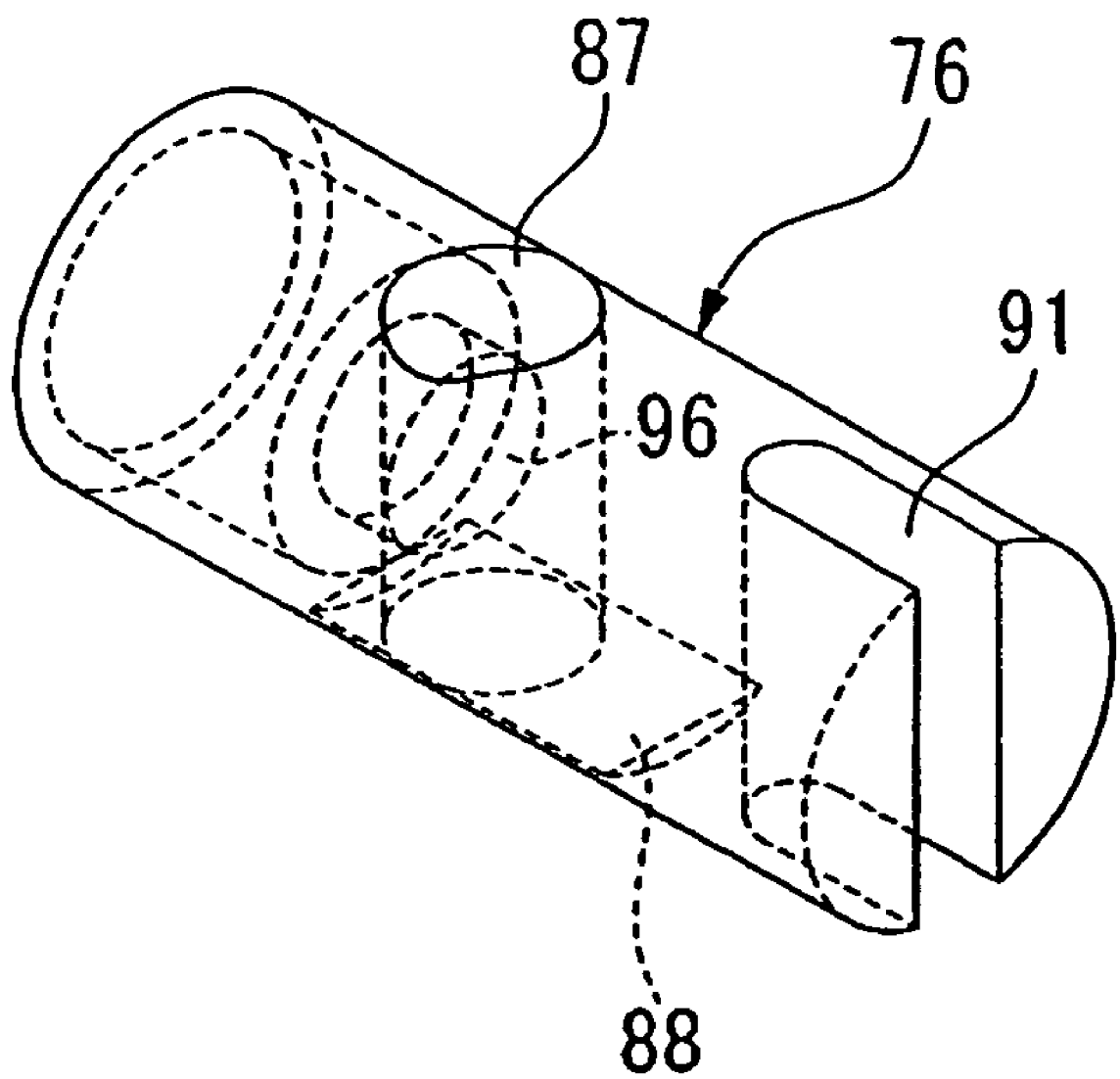
FIG. 8 is a perspective view of a slide pin in the embodiment.
Figure 9A:
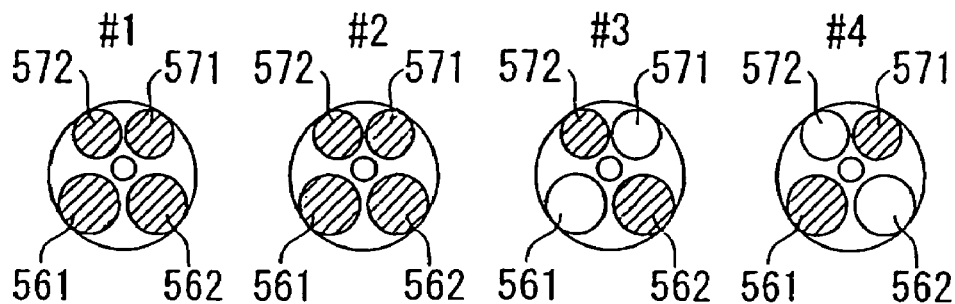
FIG. 9 is a schematic view of cylinder number control of the embodiment.
Figure 9B:
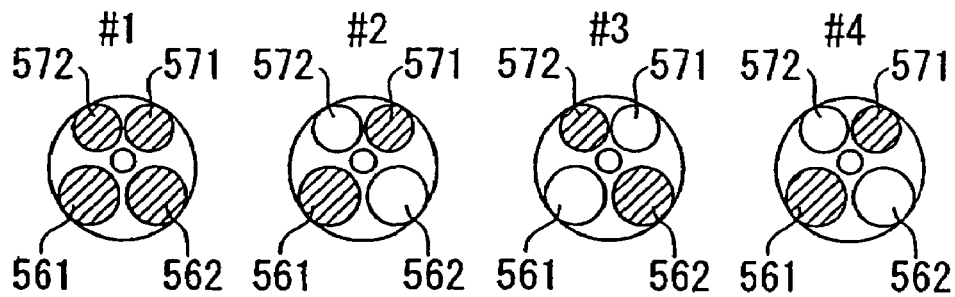
Figure 9C:
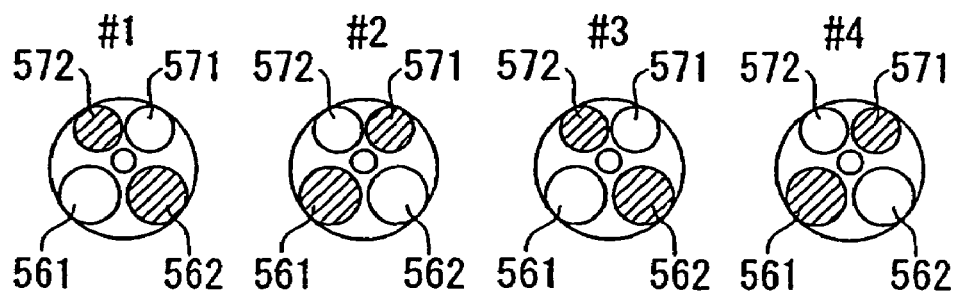
Figure 9D:
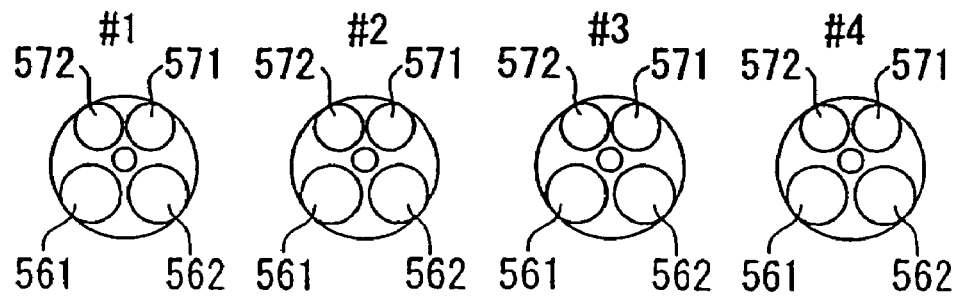

As shown in FIG. 8, an accommodating hole 87 is provided at an intermediate portion in the axial direction of the slide pin 76. The accommodating hole 87 coaxially connects to the insertion hole 81 and the extension hole 82 such that it can accommodate an end portion of the valve stem 59 therein. An end portion of the accommodating hole 87 on the insertion hole 81 side is open to a flat contacting face 88 which is formed on the outer side face of a lower portion of the slide pin 76 in an opposing relationship to the insertion hole 81. Here, the contacting face 88 is formed comparatively long along the axial direction of the slide pin 76, and the accommodating hole 87 is open to a portion of the contacting face 88 on the spring chamber 86 side.

The slide pin 76 having such a configuration as described above is slidably moved in the axial direction such that the hydraulic force acting upon one end side of the slide pin 76 by the hydraulic pressure of the hydraulic pressure chamber 75 and the spring force acting upon the other end side of the slide pin 76 from the return spring 77 may balance each other. In an inoperative state wherein the hydraulic pressure of the hydraulic pressure chamber 75 is low, the valve stem 59 fitted in the insertion hole 81 is moved in the upward direction in FIG. 5 such that an end portion of the valve stem 59 is accommodated into the accommodating hole 87 and the extension hole 82. In an operative state wherein the hydraulic pressure of the hydraulic pressure chamber 75 is high, however, the slide pin 76 is displaced from the axial line of the insertion hole 81 and the extension hole 82 and the valve stem 59 is moved in the downward direction in FIG. 5 such that an end portion of the valve stem 59 contacts with the contacting face 88.

Consequently, when the slide pin 76 is moved to the position at which the accommodating hole 87 thereof connects coaxially with the insertion hole 81 and the extension hole 82, the valve lifter 71I is slidably moved by the pressing force acting thereupon from the first intake side valve cam 69I, whereupon also the pin holder 74 and the slide pin 76 are moved to the first intake valve 56I side together with the valve lifter 71I. However, the end portion of the valve stem 59 is merely accommodated into the accommodating hole 87 and the extension hole 82, but the pressing force in the valve opening direction does not act from the valve lifter 711 and the pin holder 74 upon the first intake valve 56₁. Consequently, the first intake valve 56₁ remains in an inactive state.

On the other hand, when the slide pin 76 is moved to the position at which the end portion of the valve stem 59 contacts with the contacting face 88 of the slide pin 76, since the pressing force in the valve opening direction acts upon the first intake valve 56₁ upon movement of the pin holder 74 and the slide pin 76 to the first intake valve 56₁ side in response to sliding movement of the valve lifter 711 by the pressing force acting from the first intake side valve cam 69₁, the first intake valve 56₁ operates to open and close in response to rotation of the first intake side valve cam 69₁.

Incidentally, if the slide pin 76 is rotated around the axial line thereof within the pin holder 74, then the axial lines of the accommodating hole 87 and the insertion hole 81 and extension hole 82 are displaced from each other and it becomes impossible to allow the end portion of the valve stem 59 to contact with the contacting face 88. Therefore, rotation of the slide pin 76 around its axial line is blocked by the stopper pin 78.

The stopper pin 78 is mounted in mounting holes 89 and 90 provided coaxially in the bridging portion 74b of the pin holder 74 such that a portion thereof on one end side of the sliding hole 80 is sandwiched between them. The stopper pin 78 extends through a slit 91 provided on one end side of the slide pin 76 such that it is open to the hydraulic pressure chamber 75 side. In particular, the stopper pin 78 is mounted on the pin holder 74 such that it extends through the slide pin 76 while allowing movement of the slide pin 76 in the axial direction, and as the stopper pin 78 contacts with the inner end closed portion of the slit 91, also the movement end of the slide pin 76 to the hydraulic pressure chamber 75 side is restricted.

A coil spring 92 is interposed between the pin holder 74 and the cylinder head 40 and biases the pin holder 74 in a direction in which the shim 84 mounted on the pin holder 74 contacts with the projection 85 provided at a central portion of the inner face of the closed end of the valve lifter 711. The coil spring 92 is attached in such a manner as to surround the valve stem 59 at a position at which an outer periphery thereof is prevented from contacting with the inner face of the valve lifter 711. A pair of projections 93 and 94 are formed integrally in a projecting manner on the bridging portion 74b of the pin holder 74. The projections 93 and 94 position the end portion of the coil spring 92 in a direction perpendicular to the axial direction of the valve stem 59.

Here, the projections 93 and 94 are provided integrally in a projecting manner on the pin holder 74 with a projecting amount smaller than the wire diameter of the coil spring 92 and are formed in arcs centered at the axial line of the valve stem 59. Further, a stepped portion 95 is formed on the projection 93 from between the projections 93 and 94 for contacting with an end portion of the stopper pin 78 on the first intake valve 56₁ side to block the stopper pin 78 from moving toward the first intake valve 56₁ side.

The slide pin 76 has a communication hole 96 formed therein for communicating the spring chamber 86 with the accommodating hole 87 to prevent increase or decrease of the pressure in the spring chamber 86 by a movement of the slide pin 76 in the axial direction. Meanwhile, the pin holder 74 has another communication hole 97 formed therein for communicating the space between the pin holder 74 and the valve lifter 711 with the spring chamber 86 to prevent the pressure in the space from being varied by a temperature variation.

The cylinder head 40 has a supporting hole 98 formed therein for receiving the valve lifter 711 to support the valve lifter 711 for sliding movement, and an annular recess 99 is formed on the inner face of the supporting hole 98 such that it surrounds the valve lifter 711. The valve lifter 711 has a communication hole 100 formed therein for communicating the annular recess 99 with the annular groove 79 of the pin holder 74 irrespective of sliding movement of the valve lifter 711 within the supporting hole 98. The valve lifter 711 further has a release hole 101 formed therein. The release hole 101 is provided at a position in the valve lifter 711 at which, when the valve lifter 711 moves to its uppermost position as seen in FIG. 5, the release hole 101 establishes communication of the annular recess 99 with the inside of the valve lifter 711 below the pin holder 74, but as the valve lifter 711 moves downward from the uppermost position as seen in FIG. 5, the communication with the valve lifter 711 is intercepted. Thus, lubricating oil is jetted from the release hole 101 into the valve lifter 711.

Further, working fluid supply paths 103A, 103B and 103C hereinafter described are provided in the cylinder head 40 and communicate with the annular recesses 99 provided for the individual combustion chambers 43.

The first and second exhaust valves 57₁ and 57₂ of the combustion chambers 43 are driven by an exhaust side valve system 68E. The exhaust side valve system 68E includes a camshaft 106, valve lifters 107₁ and 107₂ of a bottomed cylindrical shape. The camshaft 106 has provided thereon first exhaust side valve cams 105₁ individually corresponding to the first exhaust valves 57₁ and second exhaust side valve cams 105₂ individually corresponding to the second exhaust valves 57₂. The valve lifters 107₁ are supported on the cylinder head 40 such that they can be slidably moved following the first exhaust side valve cams 105₁. The valve lifters 107₂ are supported on the cylinder head 40 such that they can be slidably moved following the second exhaust side valve cams 105₂.

The camshaft 106 has an axial line perpendicular to the axial line extensions of the valve stems 61 of the first and second exhaust valves 57₁ and 57₂ and is supported for rotation between the cylinder head 40 and the holder 55 coupled to the cylinder head 40 similarly to the camshaft 70 of the intake side valve system 68I. The valve lifters 107₁ are fitted for sliding movement in the cylinder head 40 in same coaxial directions with the axial lines of the valve stems 61 of the first exhaust valves 57₁ and slidably contact at outer faces of the closed ends thereof with the first exhaust side valve cams 105₁.

Meanwhile, the valve lifters 107₂ are fitted for sliding movement in the cylinder head 40 in same coaxial directions with the axial lines of the valve stems 61 of the second exhaust valves 57₂ and slidably contact at outer faces of the closed ends thereof with the second exhaust side valve cams 105₂.

Tip ends of the valve stems 61 of the second exhaust valves 57₂ contact with the inner faces of the closed ends of the valve lifters 107₂ such that, during operation of the engine E, the valve stems 61 are normally operated to open and close the second exhaust valves 57₂ by the second exhaust side valve cams 105₂. Meanwhile, a valve cut-off mechanism 73E is provided between each of the valve stems 61 of the first exhaust valves 57₁ and the corresponding valve lifter 107₁. The valve cut-off mechanism 73E can change over between an active state and an inactive state of the pressing force in the valve opening direction from the valve lifter 1071 to the first exhaust valve 571. Thus, when the engine E is in a particular operation region, for example, when the engine E is in a low load region such as a low speed operation region, the valve cut-off mechanism 73E places the pressing force into an inactive state to place the first exhaust valve 571 into a cut-off state irrespective of a sliding movement of the valve lifter 1071. The valve cut-off mechanism 73E is configured similarly to the valve cut-off mechanism 73I of the intake side valve system 68I.

In the #3 cylinder, a valve cut-off mechanism 73E and another valve cut-off mechanism 73I having similar configurations to those of the #4 cylinder described above are provided for the second exhaust valve 572 (corresponding to the second exhaust valve port 452) and the second intake valve 562 (corresponding to the second intake valve port 442), respectively, conversely to the arrangement in the #4 cylinder. Further, a valve cut-off mechanism 73I and a valve cut-off mechanism 73E are provided for all of the intake valves and the exhaust valves of the #2 cylinder and the #1 cylinder.

Accordingly, the #1 cylinder and the #2 cylinder can perform cylinder cut-off wherein all of the engine valves thereof are cut off while the #3 cylinder and the #4 cylinder can perform valve cut-off wherein one engine valve is cut off on both of the intake side and the exhaust side (while the cylinders normally operate).

As shown in FIG. 4, the cam chain case C is provided on the side wall of the cylinder head 40 on the #4 cylinder side. A cam chain not shown for driving the camshafts 70 and 106 of the intake side and exhaust side valve systems 68I and 68E is accommodated in the cam chain case C.

Connection ports PA, PB and PC of oil pressure regulating valves 113A, 113B and 113C are formed in a side wall of the cylinder head 40 on the opposite side to the cam chain case C. The oil pressure regulating valves 113A, 113B and 113C control supply of working fluid to the valve cut-off mechanisms 73I and 73E of the intake side and exhaust side valve systems 68I and 68E.

The connection port PA is connected to the working fluid supply path 103A which extends along a longitudinal direction of the cylinder head 40 between a central portion of the cylinder head 40 in the forward and backward direction and the intake valve ports to the location of the second intake valve port 442 of the #2 cylinder in the cylinder head 40 and is branched to the second intake valve port 442 of the #2 cylinder and the second exhaust valve port 452 of the #2 cylinder.

The connection port PB is connected to the working fluid supply path 103B which extends along the longitudinal direction of the cylinder head 40 between a central portion of the cylinder head 40 in the forward and backward direction and the exhaust valve ports to the location of the first exhaust valve port 451 of the #1 cylinder in the cylinder head 40 and is branched to the first exhaust valve port 451 of the #1 cylinder and the first intake valve port 441 of the #1 cylinder.

The connection port PC is connected to the working fluid supply path 103C which extends along the longitudinal direction of the cylinder head 40 in the second side wall of the cylinder head 40 to the location of the first exhaust valve port 451 of the #4 cylinder and is branched to the first exhaust valve port 451 of the #4 cylinder, the second exhaust valve port 452 of the #3 cylinder, the first exhaust valve port 451 of the #2 cylinder and the second exhaust valve port 452 of the #1 cylinder. Corresponding to the working fluid supply path 103C, a working fluid supply path 103C' is formed along the longitudinal direction of the cylinder head 40 in the rear wide wall of the cylinder head 40 and extends to the location of the first intake valve port 441 of the #4 cylinder. The working fluid supply path 103C and the working fluid supply path 103C' are connected to each other by a crossing path 103X. The working fluid supply path 103C' is branched and connected to the first intake valve port 441 of the #4 cylinder, the second intake valve port 442 of the #3 cylinder, the first intake valve port 441 of the #2 cylinder and the second intake valve port 442 of the #1 cylinder. Note that two valves on #4 cylinder and two valves on #3 cylinder are in fluid isolation with respect to the working fluid supply paths.

Accordingly, in the #1 cylinder and the #2 cylinder from among those cylinders which are positioned on the opposite side to the cam chain case C, that is, the #1 cylinder, #2 cylinder and #3 cylinder, all engine valves, that is, the first intake valves 561, second intake valve 562, first exhaust valves 571 and second exhaust valves 572 are formed for cut-off operation.

Thus, each of the oil pressure regulating valves 113A, 113B and 113C applies the working fluid pressure from an in port IN to the connection port PA, PB or PC when the solenoid not shown is operated to ON, but introduces, when the solenoid is operated to OFF, the working fluid pressure to a drain port D such that the working fluid is supplied to the valve cut-off mechanisms 73E and 73I through the working fluid supply path 103A, working fluid supply path 103B and working fluid supply path 103C (103C') by the oil pressure regulating valves 113A, 113B and 113C, respectively. It is to be noted that, in FIG. 4, reference character IN denotes an in port, OUT an out port, and D a drain port.

As a result, the engine E of the present embodiment performs, when the engine is idling or in a low load region, cylinder cut-off (cut-off of all valves) in the #1 cylinder and the #2 cylinder, and performs valve cut-off in the #3 cylinder and the #4 cylinder as seen in (a) of FIG. 9. When the engine is in a low or middle load region, the engine E performs cylinder cut-off (cut-off of all valves) in the #1 cylinder and performs valve cut-off in the #2 cylinder, #3 cylinder and #4 cylinder as seen in (b) of FIG. 9. When the engine is in a middle load region, the engine E performs valve cut-off in all of the cylinders from the #1 cylinder to the #4 cylinder to operate them as seen in (c) of FIG. 9. When the engine is in a high load region, the engine E can operate all of the engine valves, without performing valve cut-off, in all of the cylinders from the #1 cylinder to the #4 cylinder as seen in (d) of FIG. 9.

Accordingly, at least the #4 cylinder which is a cylinder on one end side from among the four cylinders disposed in-line serves as a normally operative cylinder (cylinder wherein only some of the engine valves is cut off), and at least the #1 cylinder which is a cylinder on the other end side is a cylinder which can be cut off (cylinder wherein all of the engine valves can be cut off).

Here, the timing at which the engine enters into any of the load regions can be determined depending upon the engine speed and the grip opening. Accordingly, while the engine speed changes from the idling or low load region through the low and medium load region and the middle load region to the high load region, valve cut-off and cylinder cut-off can be performed stepwise to achieve smooth acceleration and deceleration. Further, if an electronically controlled throttle is adopted for the throttle valves TH, then since such control that, when cylinder cut-off is to be performed, the throttle valves TH corresponding to the cylinders to be cut off are closed, but when the valve cut-off is to be canceled, the throttle valves TH are successively opened can be performed, upon restoration from the cylinder cut-off, the shock can be minimized thereby to achieve smooth running. It is to be noted that a circle represented by slanting lines indicates an engine valve in a cut-off state.

According to the embodiment described above, all of the first intake valve 561, second intake valve 562, first exhaust valve 571 and second exhaust valve 572 which are engine valves of each of the #1 cylinder and the #2 cylinder positioned on the opposite side to the cam chain case C are formed such that they can be cut off by the valve cut-off mechanisms 73I and 73E. Therefore, the connection ports PA, PB and PC of all of the hydraulic circuits for applying a working fluid pressure to the valve cut-off mechanisms 73I and 73E, that is, all of the working fluid supply path 103A, working fluid supply path 103B and working fluid supply path 103C (working fluid supply path 103C'), can be provided in the side wall of the cylinder head 40 on the opposite side to the cam chain case C. Consequently, the working fluid supply path 103A and the working fluid supply path 103B which are hydraulic pressure paths from the connection ports PA and PB to the #1 cylinder and the #2 cylinder can be formed shorter and can be simplified.

Accordingly, the cylinder head can be miniaturized by an amount by which the working fluid supply path 103A and the working fluid supply path 103B are formed shorter.

In short, where a cylinder wherein all engine valves are cut off is provided on the side on which the cam chain case C is provided, it is necessary to extend the working fluid supply path 103A and the working fluid supply path 103B corresponding to them up to the cam chain case C side. Consequently, the path length increases as much and the cylinder head 40 increases in size as much.

As a result, the in-line four-cylinder engine which has a great length in the vehicle widthwise direction from its nature can be miniaturized. Therefore, application to a straight four-cylinder engine wherein the first intake valve 561, second intake valve 562, first exhaust valve 571 and second exhaust valve 572 can be cut off is facilitated.

In particular, while working fluid supply paths are required where it is tried to provide cylinder cutting off and valve cutting off functions to the motorcycle 1 wherein the cam chain case C is disposed on the outer side in the widthwise direction of the engine E in order to achieve reduction in size and weight of the engine E, the working fluid supply paths can be disposed such that the engine E does not increase in scale as far as possible.

Further, since the #4 cylinder which is a cylinder on the one end side from among the four cylinders disposed in-line is formed as a normally operative cylinder while the #1 cylinder which is a cylinder on the other end side is formed as a cylinder which can be cut-off, the connection ports PA, PB and PC can be provided in the side wall of the cylinder head 40 on the side on which the #1 cylinder that can be cut off is disposed. Therefore, the working fluid supply path 103A and the working fluid supply path 103B which are hydraulic pressure paths from the connection ports PA and PB to the #1 cylinder and the #2 cylinder can be formed shorter and simplified. Consequently, the cylinder head 40 can be miniaturized by an amount by which they are simplified.

It is to be noted that the present invention is not limited to the embodiment described above but includes also a case wherein, for example, only the #1 cylinder can be controlled to a cylinder cut-off state. Further, the valve cut-off mechanisms 73I and 73E are a mere example, and the present invention is not limited to such a structure as just described only if some cylinder can be hydraulically placed into a cut-off state.

As described above, according to the invention, it is possible to set ports for many working fluid supply paths to a side wall of the cylinder head on the opposite side to the cam chain case in which the working fluid supply paths are formed in order to cut off all of the engine valves. Consequently, there is an effect that the working fluid supply paths from the ports to some of the cylinders wherein all of the engine valves are formed such that they can be cut off from among those cylinders which are positioned on the opposite side to the cam chain case can be formed shorter and can be simplified.

Accordingly, the cylinder head can be miniaturized by an amount by which the working fluid supply paths are simplified.

According to the invention, the in-line four-cylinder engine which has a great length in the vehicle widthwise direction from its nature can be miniaturized. Therefore, there is an effect that application to a straight four-cylinder engine wherein the engine valves can be cut off is facilitated.

According to the invention, it is possible to set ports for working fluid Supply paths to a side wall of the cylinder head on which those cylinders which can be cut off are disposed. Therefore, the working fluid supply paths to the cylinders which can be cut off may be formed shorter and simplified. Accordingly, there is an effect that the cylinder head can be miniaturized by an amount by which the working fluid supply paths are simplified.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A multi-cylinder engine comprising:
    an engine portion, wherein the engine portion includes a first end, a second end;
    a cam chain case disposed adjacent to a first end of the engine portion;
    a working fluid port positioned at the second end of the engine portion;
    a plurality of engine cylinders disposed between the cam chain case and the working fluid port, wherein each cylinder includes a plurality of valves;
    a plurality of working fluid channels connecting the working fluid port to the plurality of valves, wherein at least one valve of the cylinder adjacent the cam chain case is in fluid isolation from the working fluid port.

2. The multi-cylinder engine according to claim 1, wherein the engine portion is an in-line cylinder engine.

3. The multi-cylinder engine according to claim 2, wherein the cylinder at the second end can be completely shut off while other cylinders continue to run whereas the cylinder at the first end cannot be shut off while any other cylinders continue to run.

4. A multi-cylinder engine comprising:
    an engine including a plurality of combustion chambers, each combustion chamber including a plurality of intake valves and a corresponding plurality of exhaust valves, wherein at least one combustion chamber can be completely shut off by placing the intake valves and exhaust valves thereof into a cut-off state and one combustion chamber can be partially shut off by placing at least one intake valve and at least one exhaust valve thereof into a cut-off state, a shut off mechanism disposed at a first end of the engine, wherein the combustion chamber that can be completely shut off is positioned between the shut off mechanism and the combustion chamber that can be partially shut off.

5. The multi-cylinder engine according to claim 4, wherein the shut off mechanism includes working fluid channels and working fluid ports.

6. The multi-cylinder engine according to claim 5, wherein the engine includes four in-line combustion chambers each having at least two intake valves and at least two exhaust valves.

7. The multi-cylinder engine according to claim 6, wherein at least two intake valves and at least two exhaust valves of the two combustion chambers nearest a working fluid port can be cut off.

8. The multi-cylinder engine according to claim 6, wherein at most half of the intake and exhaust valves of the two combustion chambers furthest away from the working fluid ports can be cut off.

9. A multi-cylinder engine comprising:

an engine including four in-line combustion chambers each having at least four valves, wherein at least one combustion chamber can be completely shut off and one combustion chamber can be partially shut off, and wherein at least four valves of the two combustion chambers nearest a working fluid port can be cut off; and a shut off mechanism disposed at a first end of the engine, wherein the combustion chamber that can be completely shut off is positioned between the shut off mechanism and the combustion chamber that can be partially shut off.

10. A multi-cylinder engine comprising:

an engine including four in-line combustion chambers each having at least four valves, wherein at least one combustion chamber can be completely shut off and one combustion chamber can be partially shut off, and wherein at most half of the valves of the two combustion chambers furthest away from a working fluid port can be cut off; and a shut off mechanism disposed at a first end of the engine, wherein the combustion chamber that can be completely shut off is positioned between the shut off mechanism and the combustion chamber that can be partially shut off.

* * * * *